United States Patent [11] 3,599,230

[72] Inventor Milton Alden
 Needham, Mass.
[21] Appl. No. 793,130
[22] Filed Jan. 22, 1969
[45] Patented Aug. 10, 1971
[73] Assignee Alden Research Foundation
 Brockton, Mass.

[54] RECORDER BLADE ASSEMBLY
 5 Claims, 6 Drawing Figs.
[52] U.S. Cl. .................................................... 346/139,
 346/101
[51] Int. Cl. ...................................................... G01d 15/24
[50] Field of Search ........................................ 346/101,
 139, 74 E, 74 SB, 74 SC, 74 CH

[56] References Cited
UNITED STATES PATENTS
2,621,999 12/1952 Alden ........................... 346/74
2,743,990 5/1956 Leonard ....................... 346/101
3,417,405 12/1968 Alden ........................... 346/101 X Primary Examiner—Joseph W. Hartary
Attorney—Norman S. Blodgett ABSTRACT: This invention relates to a recorder blade assembly and, more particularly, to a recording apparatus wherein a movable electrode is provided in the form of a loop and is continuously driven for movement in a straight line through the recording area.

PATENTED AUG 10 1971 3,599,230

INVENTOR
MILTON ALDEN

BY
Norman S. Blodgett
ATTORNEY

3,599,230

RECORDER BLADE ASSEMBLY

BACKGROUND OF THE INVENTION

One of the best methods of graphic communication is by use of a recorder using electrosensitive paper. The paper is passed between a blade-type electrode and a helical electrode so that the incoming electrical signal is passed through the paper in successive spaced lines to reproduce the image. Such a recorder is shown and described in the patent of Alden U.S. Pat. No. 2,621,999. However, these recorders of the prior art have had a number of drawbacks, not the least of which is that the blade has been very expensive to make. This is because the old methods of driving the blade have required that the loop be of exactly a predetermined size and that it be without a joint, For that reason, it has been the practice to form the loop from a ring by the rolling method and this is a slow and expensive process. These and other difficulties experiences with the prior art devices have been obviated in a novel manner by the present invention.

It is, therefore, an outstanding object of the invention to provide a recorder blade assembly that makes use of an inexpensive loop blade without sacrifice of recording quality.

Another object of this invention is the provision of a recorder blade assembly in which the blade loop is driven continuously by a small motor and in which perforations in the loop used for driving need not be accurately located and sized.

A further object of the present invention is the provision of a recorder blade assembly wherein a loop-type blade is driven by a sprocket gear engaging perforations in the blade and wherein wear of the blade or its reversal does not affect this driving engagement.

It is another object of the instant invention to provide a recorder blade assembly wherein the blade can be moved at a high rate of speed to reduce uneven reduction in the edge of the blade and to assist in the removal of foreign matter that would otherwise interfere with the recording process.

A still further object of the invention is the provision of a recorder blade assembly wherein the blade is not subject to vibration or sporadic movement.

Another object of the invention is the provision of a recorder blade assembly in which a worn blade can be removed and replaced by a new blade in a very short time and without the use of special tools or skilled personnel.

A further object of the invention is the provision of a recorder blade assembly using a motor of relatively low torque rating.

With these and other objects in view, as will be apparent to those skilled in the art, the invention resides in the combination of parts set forth in the specification and covered by the claims appended hereto.

SUMMARY OF THE INVENTION

In general, the present invention consists of a recorder blade assembly having a mounting plate which supports an endless loop perforated blade. A plurality of guides are fastened to the plate and serve to guide the blade in a predetermined path, including a straight run where recording takes place. A sprocket gear engages the blade for producing continuous movement thereof and a motor is mounted on the plate for rotating the gear.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
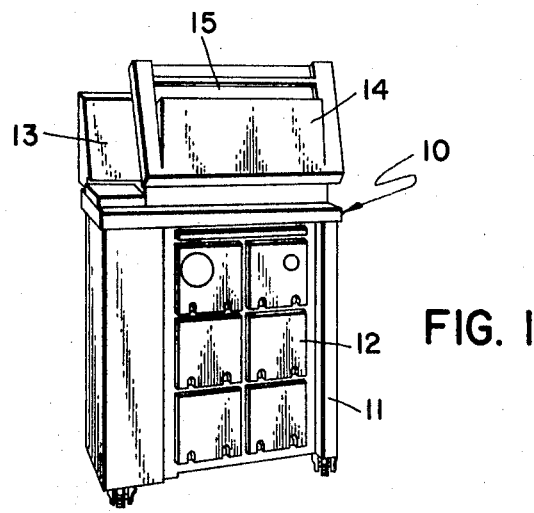
FIG. 1 is a perspective view of a recorder incorporating a recorder blade assembly embodying the principles of the present invention.

Referring first to FIG. 1, a recorder 10 is shown as having a base 11 containing electronic gear 12 for receiving and treating electrical communications signals. Mounted on the top of the is a recorder housing 13 containing a helical electrode (not shown) and the means for driving it. Hingedly connected to the front of the housing is a cover 14 having a window 15 for observing the graphic communications display.

Figure 2:
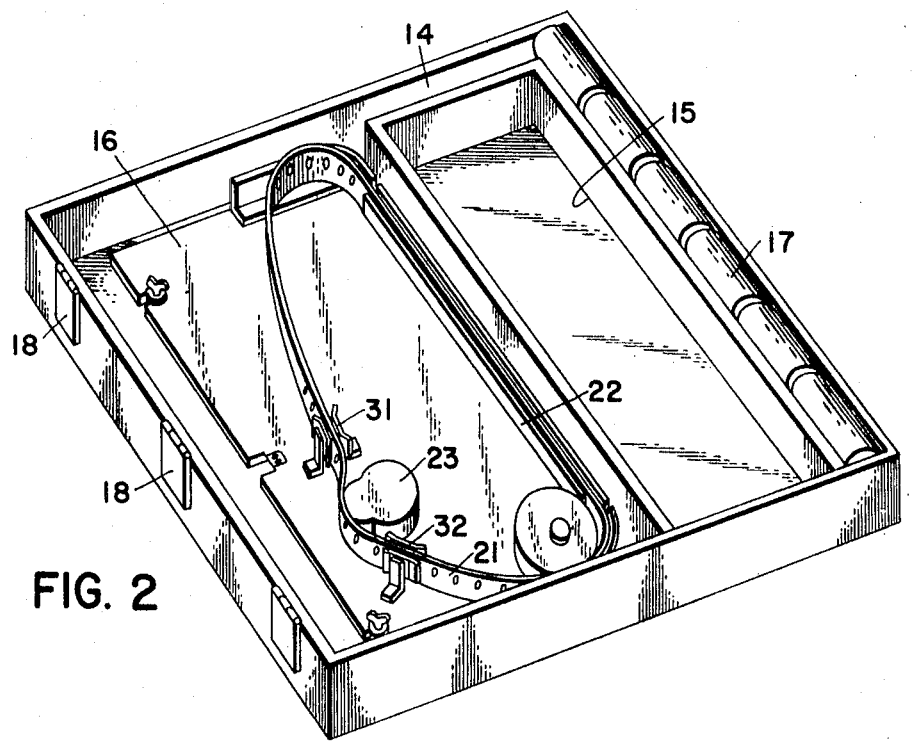
FIG. 2 is a perspective of the cover of the recorder showing the blade assembly in place.

In FIG. 2 is shown the inside of the cover 14 where is evident the recorder blade assembly 16. The cover has rollers 17 on the side of the window 15 opposite the assembly. Hinges 18 are the means provided to connect the cover to the housing 13 of the recorder. The blade assembly 16 is provided with a mounting plate 19 of generally rectangular configuration. A blade 21 is mounted on the plate in the form of a loop of perforated stainless steel bond. The blade is supported by a plurality of guides including an elongated guide 22 which is located adjacent the window 15 and which guides the blade in a straight run where recording takes place. These guides are coated with Teflon to reduce wear and vibration. A drive means engages the blade and produces continuous motion thereof; this means is hidden in FIG. 2 by a plastic cover 23.

Figure 3:
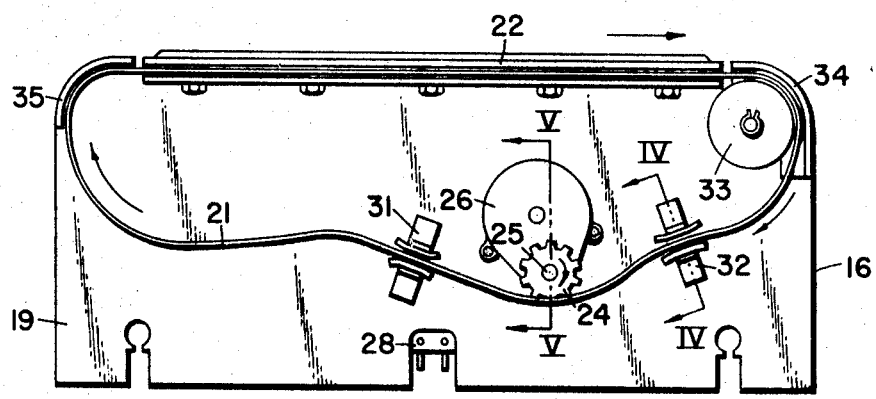
FIG. 3 is a plan view of the blade assembly.
Figure 4:
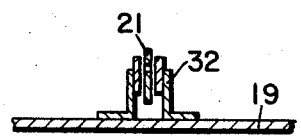
FIG. 4 is a sectional view of the assembly taken on the line IV-IV of FIG. 3.
Figure 5:
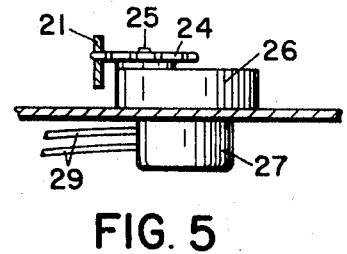
FIG. 5 is a sectional view of the assembly taken on the line V-V of FIG. 3.

Referring to FIGS. 3, 4, and 5, it can be seen that the driving means consists of a sprocket gear 24 mounted on the output shaft 25 of a speed reduction unit 26, which, in turn, is driven by an electric motor 27, Wires 29 extend from the motor to a plug 28 mounted on the plate 19 which is connected to a source of electrical current when the cover 14 is assembled with the recorder. Two of the guides 31 and 32 are located on either side of the sprocket gear to produce a relatively sharp bend in the blade, the curvature in the blade corresponding generally to the curvature of the pitch line of the gear. One of the guides is formed by a roller 33 located at the downstream end of the straight guide 22 and by a curved flange 34 whose curve is concentric with the roller. A similar curved flange 35 is located at the entrance end of the guide 22.

Figure 6:
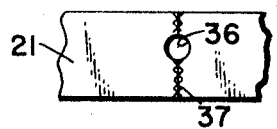
FIG. 6 is an enlarged view of the blade in the area of a welded joint.

As has been stated, the loop blade 21 is formed from a strip of stainless steel which has been perforated. The ends of the strip are butt welded together and the joint is ground smooth. This is a much less expensive procedure than the former practice of rolling the loop from a ring. Its practicality has been made possible for the self-compensating features of the present invention. As is shown in FIG. 6, it is desirable to place a perforation 36 at the butt welded joint 37. The welding operation makes the adjacent section of the blade somewhat stiff, so that a suitable reduction of the cross-sectional area of this part of the blade maintains its stiffness at a value experienced at other parts of the blade.

The operation of the assembly will be readily understood from the above description. Assume, first of all, that the cover 14 forms part of the recorder 10 and the plug 28 is connected to power. The motor 27 rotates the gear 24 in a clockwise (as viewed in FIG. 3) direction through the speed reduction unit 26. The loop is, therefore, under tension between the downstream end of the straight portion and the gear. It is free of tension and allowed to loop freely between the gear and the downstream end of the straight guide 22. This free loop assures that the size of the loop blade is not critical; variations in length do not affect the motion of the blade at the critical point, i.e., when it passes through the guide 22. The fact that the guides 31 and 32 bend the loop around the sprocket gear 24 causes more than one sprocket tooth to engage the perforations in the blade. This means that inaccuracies in the size and location of the perforations do not cause an erratic motion of the blade or even, as in the past, stoppage of the blade because no driving force took place on the blade. The high-speed movement of the blade gives a better wiping effect for the removal of chemical residue; such accumulation comes about because the chemically coated paper is dragged across the straight portion of the blade during recording. The higher speed results in better distribution of wear. The recording process involves ion migration from the blade into the paper and higher speed means that the probability of the spots where greatest ion loss takes place coinciding is less. Irregularities in wear on a blade cause poor recording quality. It is interesting to note that the particular drive arrangement permits the blade to be driven by the gear 24 in a plane which is not necessarily the same plane in which the remainder of the blade lies. The permits the blade to be reversed in the assembly after it has been worn close to the perforations without affecting its operation. Under some circumstances, it may be necessary to use more than one blade, and the present invention would make it possible to drive a plurality of blades together. It can be seen that this arrangement allows an old blade to be replaced very quickly. No tools are needed to do so, nor need the person doing the changing be at all skilled. Furthermore, the motor can be of the low torque variety, such as a synchronous timing motor which is not only inexpensive, but also is relatively light in weight, so that the cover does not become excessively heavy.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

I claim:

1. A recorder blade assembly, comprising
   a. a mounting plate,
   b. en endless loop perforated blade supported on the plate, the blade being formed from a perforated strip of stainless steel by welding its ends together,
   c. a plurality of guides fastened to the plate and guiding the blade in a predetermined path, including a straight run where recording takes place,
   d. a sprocket gear engaging the blade for producing continuous motion thereof, two of the guides being located on either side of the sprocket gear to produce a relatively sharp bend in the blade, the curvature in the blade corresponding generally to the curvature of the pitch line of the gear, and
   e. means for placing the loop under tension between the downstream end of the straight portion and the gear and for placing the loop free of tension and allowed to loop freely between the gear and the upstream end of the straight portion.

2. A recorder blade assembly as recited in claim 1 wherein one of the said guides consists at least in part of a roller located at the downstream end of the said straight run.

3. A recorder blade assembly as recited in claim 2, wherein the said one of the guides also has a curved flange whose curvature is concentric with the roller, the blade passing between the roller and the flange.

4. A recorder blade assembly as recited in claim 1, wherein a motor is mounted on the plate for rotating the gear.

5. A recorder blade assembly as recited in claim 1, wherein the perforations are spaced evenly along the blade and one of the perforations is located symmetrically of the weld line.